United States Patent Office 2,933,512
Patented Apr. 19, 1960

2,933,512

3-HYDROXY-7-OXOPREGN-5-EN-(17 AND/OR 21)-OLS AND ESTERS, AND PROCESSES FOR THE MANUFACTURE THEREOF

Charles W. Marshall, Skokie, Ill., assignor to G. D. Searle & Co., Chicago, Ill., a corporation of Delaware No Drawing. Application March 17, 1958
Serial No. 721,644

11 Claims. (Cl. 260—397.4)

This invention relates to 3-hydroxy-7-oxopregn-5-en-(17 and/or 21)-ols and esters, and to processes for the manufacture thereof. More particularly, this invention relates to compounds of the formula

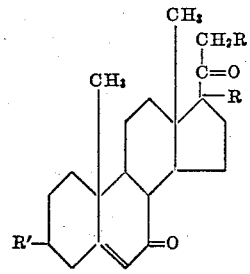

wherein one R is hydroxyl or an alkanoyloxy radical, and the other R is hydrogen, hydroxyl, or an alkanoyloxy radical; and wherein R' is hydroxyl or an alkanoyloxy, halogenated alkanoyloxy, or alkoxycarbonyloxy radical.

The alkanoyloxy radicals comprehended in the foregoing structural formula are represented by

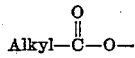

and among these, lower alkanoyloxy radicals are preferred. The latter radicals are those in which the alkyl substituent is methyl, ethyl, propyl, isopropyl, butyl, isobutyl, sec-butyl, tert-butyl, pentyl, isopentyl, tert-pentyl, neopentyl, hexyl, isohexyl, heptyl, octyl, or like $C_nH_{2n+1}$ grouping wherein $n$ is an integer amounting to less than 9. When an alkanoyloxy radical appears in the steroidal 3-position, it may be halogenated and for purposes of the present invention, the trifluoroacetoxy grouping is an especially desirable halogenated lower alkanoyloxy radical. The alkoxycarbonyloxy radicals referred to hereinabove are of the formula

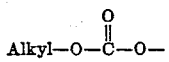

and, again, lower alkoxycarbonyloxy radicals—which is to say those wherein the alkyl substituent comprises fewer than 9 carbon atoms—are preferred.

This application is a continuation-in-part of applicant's prior copending application Serial No. 618,680, filed October 29, 1956, now abandoned.

The compounds of this invention possess valuable pharmacological properties. Especially, the subject compounds are useful because of their selective anti-cortisone activity. Administered conjointly with cortisone, they block the atrophying influence thereof on the lymph nodes and inhibit cortisone-induced susceptibility to disease, without in any way impairing the curative effects of this widely-used medicament. Like cortisone, the subject compounds protect against the hyperemia associated with specific types of iritis, and are proportionately useful anti-inflammatory substances. Finally, certain of these versatile materials exhibit anti-androgenic activity.

The compounds to which this invention relates are relatively insoluble in water, but may be dissolved in most of the common organic solvents—for example, methanol, ethanol, ethyl acetate, chloroform, and ether. The subject compounds may be administered in solid form as tablets or capsules; dissolved or suspended in aqueous media, they may be given parenterally.

The hereinafter claimed compounds comprise a relatively isolated development in the field of steroid chemistry, for although the 3-hydroxy-5-en-7-oxo configuration has been previously reported, it has not heretofore been associated with pregnane derivatives of the type now disclosed, wherein there is a ketol or dihydroxyacetone or corresponding ester substructure at carbons 17, 20, and 21. This hiatus between prior art compositions and those of the instant invention is probably attributable to the difficulty of introducing a 7-oxo function into steroids containing an alcohol or ester grouping in the 17 and/or 21 position without, at the same time, effecting oxidative degradation of such grouping.

A preferred means for achieving the desired oxygenation comprises contacting in a predominantly lower alkanoic acid medium containing 15–35% of a compatible dehydrating agent, an anhydrous alkali chromate with an appropriately and completely esterified 7-methylene steroid otherwise the same as the contemplated product. Contact is ordinarily maintained at temperatures ranging from 25° to 50° Centigrade, and for periods of time amounting to between 36 and 60 hours. The lower alkanoic acid and compatible dehydrating agent of choice are acetic acid and acetic anhydride, respectively, while water-free sodium or potassium chromate is most often used (as the oxidant). From the 7-oxo esters obtained via the foregoing procedure, corresponding alcohols are derived by mild saponification; and these, of course, may be converted to the same or other esters of the invention by treatment with, for example, one or more equivalents of a suitable acid anhydride or chloride in the presence of an anhydrous, solvent, base, such as pyridine.

As to the steroidal starting material employed in the above oxidation, esterification thereof is preferably—as foresaid—not only complete, for protection of all hydroxyls present, but appropriate to the ultimate product in view. Accordingly, the starting steroid commonly incorporates those ester groupings which it is desirable to retain in the molecule following oxidation, and/or such other ester radicals as may perhaps be more conveniently introduced—in any event, however, subject to the following consideration: that where it is intended eventually to cleave the 3-ester linkage of the compound produced, in the presence of additional ester linkages at carbons 21 or 17,21, preliminary esterification of the 3-position must be such as will permit subsequent saponification without deleterious effect. Either the 3-trifluoroacetate or the 3-ethoxycarbonyloxy ester is especially adapted to this objective. Whereas it is well known in the steroidal art that particularly 20,21-ketal acetates and 20-oxo-17,21-diacetates—for example—are saponifiable merely upon standing 5–10 minutes at room temperatures in contact with one equivalent of 0.2–0.4% strong base, and corresponding 3-acetates require upwards of 2 hours in the presence of excess 0.6–1.4% strong base for cleavage at room temperatures; and whereas under the latter conditions, the 20,21-ketol acetates and 20-oxo-17,21-diacetates are not only saponified but otherwise and undesirably attacked, it has now been found that cleavage of 3-trifluoroacetates and 3-ethoxycarbonyloxy compounds is accomplished under substantially the same mild conditions effective for saponification in positions 21 or 17,21 aforesaid; and thus these esters are particularly appropriate as starting materials in the usage outlined.

Economically less desirable than the alkali chromate oxidation above described, but otherwise a substantially alternative route to the 7-oxo compounds of this invention, is a procedure whereby a tertiary lower alcohol ester of chromic acid—for example, tert-butyl chromate, tert-amyl chromate or the equivalent—is the oxidant employed, there being but 10–20% of a lower alkanoic acid and 2–5% of a compatible dehydrating agent present, and the remainder of the reaction medium comprising an inert, relatively non-polar solvent such as carbon tetrachloride, benzene, or a petroleum ether. The reaction is run at temperatures ranging from 35° to 65° centigrade for periods of time generally not longer than 24 hours.

The following examples describe in detail certain of the 3-hydroxy-5-en-7-ones illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted. "W/V" is the abbreviation used to designate weight by volume, and the symbols "$\mu$" and "m$\mu$" refer to microns and millimicrons, respectively, which are units of wave length.

*Example 1*

3$\beta$,21-diacetoxypregn-5-ene-7,20-dione.—To a solution of 25 parts of 3$\beta$,21-diacetoxypregn-5-en-20-one in 350 parts of carbon tetrachloride at 55–60° C. is added 50 parts of glacial acetic acid and 13 parts of acetic anhydride, following which—at the same temperature, over a 45 minute period, and with agitation—is introduced a mixture prepared by combining 50 parts of acetic acid, 13 parts of acetic anhydride, and 450 parts of a carbon tetrachloride solution of tert-butyl chromate—anhydrous and free of tert-butyl alcohol—assaying 34 parts of chromium trioxide. Heating at 55–60° C. with agitation is continued for 20 hours longer, at which point the reaction mixture is cooled to 18° C. and then combined during 30 minutes with 1000 parts of a 10% (W/V) solution of oxalic acid dihydrate in water. The resultant mixture is maintained with agitation for an additional hour, whereupon the aqueous phase is separated and extracted with carbon tetrachloride, this extract being subsequently combined with the original carbon tetrachloride phase. The carbon tetrachloride solution thus obtained is washed successively with water, aqueous 5% (W/V) sodium bicarbonate, water, and saturated brine. The purified solution is next dried over anhydrous sodium sulfate and stripped of solvent by vacuum distillation under nitrogen. The residue, upon repeated recrystallization from methanol, yields 3$\beta$,21-diacetoxypregn-5-ene-7,20-dione, which melts at 189–190° C. (uncorr.). The product has the formula

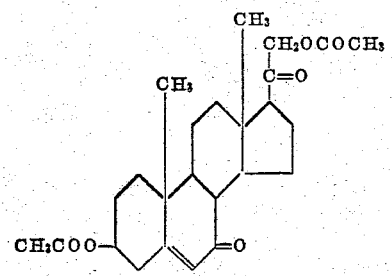

*Example 2*

3$\beta$,21-diacetoxypregn-5-ene-7,20-dione.—To a solution of 36 parts of 3$\beta$,21-diacetoxypregn-5-en-20-one in 360 parts of glacial acetic acid and 100 parts of acetic anhydride is added, portion-wise with agitation, 26 parts of anhydrous sodium chromate, the reactants being maintained at 35–40° C. by intermittent cooling. Agitation is continued at this temperature for 46 hours, whereupon the dark green reaction mixture is intimately combined with 4000 parts of ice-cold water. The solids precipitated at this point are collected on a filter and washed thereon with water. The damp filter cake is then taken up in 900 parts of ethyl acetate; and the solution thus obtained is successively washed with water, aqueous 5% (W/V) sodium bicarbonate, water, and saturated brine. The solution is next dried over anhydrous sodium sulfate, whereupon solvent is removed by vacuum distillation. The residue, crystallized from methanol, is 3$\beta$,21-diacetoxypregn-5-ene-7,20-dione, identical in all respects with the product of Example 1.

*Example 3*

A. 3$\beta$ - ethoxycarbonyloxy - 21 - acetoxypregn - 5 - en - 20-one.—To a vigorously agitated solution of 35 parts of 21-acetoxy-3$\beta$-hydroxypregn-5-en-20-one in 200 parts of pyridine is added, portion-wise, 50 parts of ethyl chloroformate over a period of 50 minutes, temperature of the reactants being adjusted to the range 25–30° C. via external cooling. Agitation is continued 15 minutes longer, whereupon the reactants are allowed to stand at room temperatures for approximately 18 hours. The mixture is then dumped into 2000 parts of ice-cold water, and the solids thus precipitated are collected on a filter and washed thereon with water. The filter cake is again suspended in water (approximately 1500 parts), following which it is filtered out and finally dried in air. Recrystallization of the product thus obtained from methanol affords needles of pure 3$\beta$-ethoxycarbonyloxy-21-acetoxypregn-5-en-20-one, melting at 158–160° C. (uncorr.).

B. 3$\beta$ - ethoxycarbonyloxy - 21 - acetoxypregn - 5 ene - 7,20-dione.—A solution of the ethoxycarbonyloxy compound of the preceding Part A of this example in 290 parts of acetic acid and 120 parts of acetic anhydride is oxidized with 12 parts of sodium chromate, using the procedure detailed in Example 2. After crystallization from methanol, the pure 3$\beta$-ethoxycarbonyloxy-21-acetoxy-pregn-5-ene-7,20-dione thus obtained melts at 208.5–210° C. (uncorr.). The product has the formula

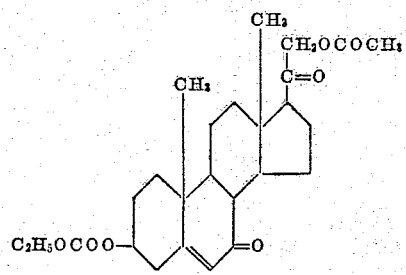

*Example 4*

3$\beta$,21-dihydroxypregn-5-ene-7,20-dione.—A solution of 9 parts of 3$\beta$-ethoxycarbonyloxy-21-acetoxypregn-5-ene-7,20-dione in 150 parts of purified dioxane is diluted with 775 parts of methanol. There is then added, at room temperature under nitrogen, 4 parts of caustic potash dissolved in 70 parts of methanol. The reactants are vigorously agitated during the addition and for 10 minutes thereafter, at which point 26 parts of aqueous methanol containing 7 parts of water is introduced. After 5 minutes more, 80 parts of aqueous 8% (W/V) acetic acid is introduced and agitation is discontinued. Most of the methanol is next removed by vacuum distillation under nitrogen. When the distilland is concentrated to approximately ⅛ of its original volume, distillation is stopped and the concentrate is combined with approximately 3000 parts of ice-cold aqueous 10% (W/V) brine. The white precipitate which is thrown down is collected on a filter and then taken up in 1000 parts of dichloromethane. The resultant solution is washed with cold water, dried over anhydrous sodium sulfate, and finally stripped of solvent by vacuum distillation. The solid residue, crystallized from ethyl acetate, affords pure 3β,21-dihydroxypregn-5-ene-7,20-dione, the melting point of which is 199–202° C. (uncorr.). The product has the formula

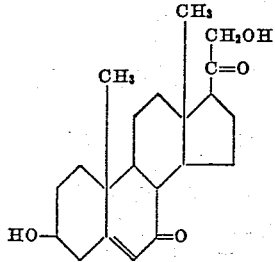

*Example 5*

A. *3β-trifluoroacetoxy-21-acetoxypregn-5-en-20-one.*— To a solution of 25 parts of 21-acetoxy-3β-hydroxypregn-5-en-20-one in 175 parts of purified dioxane is added, at 20–25° C. with agitation, 60 parts of trifluoroacetic anhydride. The reactants, protected from moisture, are maintained at room temperatures for 20 hours, following which excess anhydride is removed by vacuum distillation in an atmosphere of dry nitrogen. The residue is chilled and combined with 100 parts of cold water. The resultant mixture is immediately extracted with a mixture of 2200 parts of water and 900 parts of ethyl acetate. A second extraction, this time with 450 parts of ethyl acetate, is carried out, following which the extracts are combined, washed until neutral, dried over anhydrous sodium sulfate, and concentrated to approximately 1/20 of their original volume by vacuum distillation. Addition of 9 volumes of warm heptane to the resultant concentrate precipitates 3β-trifluoroacetoxy-21-acetoxypregn-5-en-20-one as fine, crystalline needles. Alternate recrystallization from methanol and a 1:10 mixture of ethyl acetate and heptane still further purifies the product. The material thus obtained melts at 146-150° C.

B. *3β - trifluoroacetoxy-21-acetoxypregn-5-ene-7,20-dione.*—Using the technique detailed in Example 1, 24 parts of 3β-trifluoroacetoxy-21-acetoxypregn-5-en-20-one dissolved in 640 parts of carbon tetrachloride is oxidized with 430 parts of a carbon tetrachloride solution of tert-butyl chromate—anhydrous and free of tert-butyl alcohol—assaying 27 parts of chromium trioxide, in the presence of 135 parts of acetic acid and 34 parts of acetic anhydride. The 3β-trifluoroacetoxy-21-acetoxypregn-5-ene-7,20-dione thus obtained has the formula

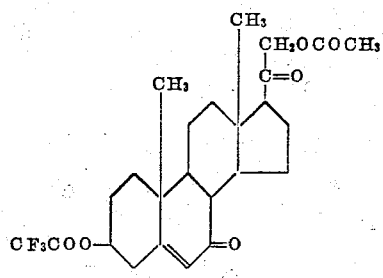

*Example 6*

*3β,21-dihydroxypregn-5-ene-7,20-dione.*—To a solution of 18 parts of 3β-trifluoroacetoxy-21-acetoxypregn-5-ene-7,20-dione in 330 parts of methanol is rapidly added, with vigorous agitation at room temperatures under nitrogen, 4.1 parts of caustic potash dissolved in 70 parts of methanol. The technique is essentially that described in Example 4. After 4 minutes, a mixture of 8 parts of methanol and 2 parts of water is introduced and then, 3 minutes later, acidification is effected with a slight excess of cold, aqueous, 1% (W/V) acetic acid. After the methanol is completely removed in vacuo, the residue is triturated with cold, aqueous, 5% (W/V) brine, and the tan solids obtained at this point are collected on a filter. After being washed on the filter with water, the filter cake is suspended in benzene, which then is removed by vacuum distillation. Recrystallized from ethyl acetate the 3β,21-dihydroxypregn-5-ene-7,20-dione thus obtained is identical in all respects with the product of Example 4.

*Example 7*

*3β,21-diheptanoyloxypregn-5-ene-7,20-dione.*—To a solution of 5 parts of 3β,21-dihydroxypregn-5-ene-7,20-dione in 50 parts of pyridine under an atmosphere of dry nitrogen is added 5 parts of heptoyl chloride. The reactants are thoroughly mixed and then let stand at room temperatures overnight. They are at this point dumped into 1000 parts of cold, aqueous, 5% (W/V) sodium bicarbonate, the resultant mixture being maintained with agitation for 1 hour. Precipitated solids are removed by repeated extraction with ethyl acetate; and the extracts are then combined and washed first with aqueous 5% (W/V) muriatic acid, and finally with water. Thus purified, the extracts are dried over anhydrous sodium sulfate, whereupon solvent is removed by vacuum distillation. The residue is 3β,21-diheptanoyloxypregn-5-ene-7,20-dione, which is still further purified by recrystallization from a mixture of acetone and methanol. The product is characterized by maxima in the infrared spectrum at 5.74, 5.80, 6.03, 6.16, and 7.96 μ. It has the formula

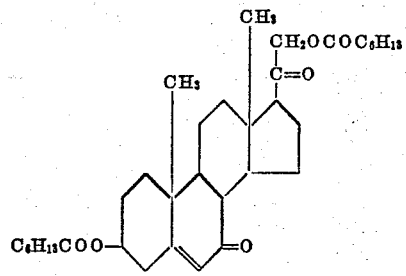

*Example 8*

*21-acetoxy-3β-hydroxypregn - 5 - ene-7,20-dione.*—To 7 parts of 3β,21-dihydroxypregn-5-ene-7,20-dione is added 70 parts of a pyridine solution containing approximately 2 parts of acetic anhydride. After agitation for a few minutes, solution occurs; and the reactants are thereupon stored at room temperatures for 15–20 hours. The reaction mixture is then diluted with 800 parts of water, after which two extractions with ethyl acetate are carried out. The extracts are combined and washed succesively with aqueous 2% (W/V) muriatic acid, aqueous 5% (W/V) sodium carbonate, and water. The washed extracts are dried over anhydrous sodium sulfate and stripped of solvent in vacuo. The residue, recrystallized several times from ethyl acetate, is pure 21-acetoxy-3β-hydroxypregn-5-ene-7,20-dione, the melting point of which is 237–240° C. (uncorr.). The product has the formula

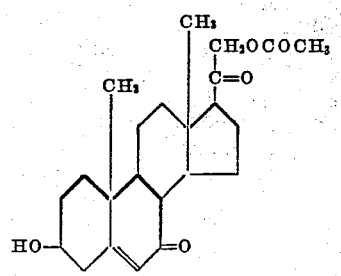

*Example 9*

*3β,17α-diacetoxypregn - 5 - ene-7,20-dione.*—3β,17α-diacetoxypregn-5-en-20-one, preparable by the method of R. B. Turner, J. Am. Chem. Soc., 75, 3489, is oxidized with sodium chromate and the reaction mixture worked-up by exactly the same procedure employed in Example 2, hereinbefore. The solid residue remaining after solvent is stripped from the purified ethyl acetate extracts, is recrystallized twice from methanol to give pure 3β,17α-diacetoxypregn-5-ene-7,20-dione, which melts at 231-234° C. (corr.), there being preliminary softening over the range 215-230° C. The product has the formula

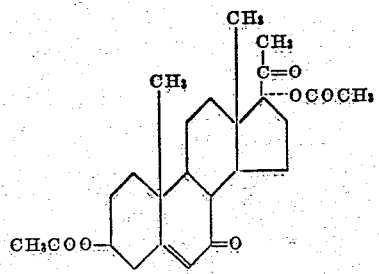

*Example 10*

3β,17α-dihydroxypregn-5-ene-7,20-dione.—To a solution of 7 parts of 3β,17α-diacetoxypregn-5-ene-7,20-dione in 250 parts of purified dioxane is added, at 25° C. under an atmosphere of nitrogen and with agitation, 125 parts of water containing approximately 4 parts of caustic potash. Cloudiness develops during the addition, but the solution clears as the water content approaches 33%. The reactants are maintained with agitation at 25° C. for 2 hours, whereupon the solution is chilled to 5° C. and added, with continued agitation, to 3000 parts of cold, aqueous 5% (W/V) brine containing a slight excess of muriatic acid. The fine, flocculent, white precipitate which forms is collected on a filter, washed thereon with cold water, and dried in air. Alternately crystallized from methanol and ethyl acetate, the product melts at 267-270° C. The material thus obtained is 3β,17α-dihydroxypregn-5-ene-7,20-dione, of the formula

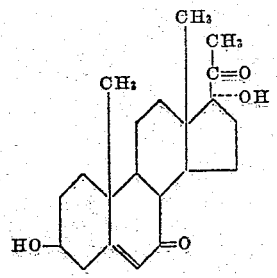

*Example 11*

A. *3β,17α,21-triacetoxypregn-5-en-20-one.*—To 10 parts of 3β,17α-dihydroxy-21-acetoxypregn-5-en-20-one in an atmosphere of nitrogen is added 400 parts of acetic acid, 800 parts of acetic anhydride, and 10 parts of p-toluenesulfonic acid monohydrate. The mixture is sufficiently agitated to induce solution, whereupon it is allowed to stand under nitrogen overnight. The mixture is then poured, slowly and with agitation, into 3500 parts of ice-cold water. The white, crystalline precipitate which forms is recovered by filtration and dried in air. Twice recrystallized from methanol, the material melts at 215-216° C. The product thus obtained is 3β,17α,21-triacetoxypregn-5-en-20-one.

B. *3β,17α,21-triacetoxypregn-5-ene-7,20-dione.*—Sodium chromate oxidation of 3β,17α,21-triacetoxypregn-5-en-20-one is carried out precisely in accordance with the procedure detailed in Example 2 above. The water-precipitated, crude, crystalline filter cake, after rewashing by suspension in water, is crystallized from ethyl acetate to give pure 3β,17α,21-triacetoxypregn-5-ene-7,20-dione, the melting point of which is 246-248 C. (uncorr.). The product has the formula

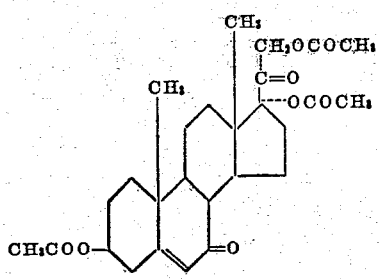

*Example 12*

A. *3β-ethoxycarbonyloxy-21-acetoxy-17α-hydroxypregn-5-en-20-one.*—To a solution of 51 parts of 3β,17α-dihydroxy-21-acetoxypregn-5-en-20-one in 700 parts of pyridine is added 71 parts of ethyl chloroformate, the procedure being exactly as detailed in Example 3A hereinbefore. The water-precipitated product is additionally washed by resuspension in water, following which it is still further purified by recrystallizing twice from methanol. The 3β-ethoxycarbonyloxy-21-acetoxy-17α-hydroxypregn-5-en-20-one thus obtained melts at 199-202° C. (uncorr.).

B. *3β-ethoxycarbonyloxy-17α,21-diacetoxypregn-5-en-20-one.*—A solution of 28 parts of 3β-ethoxycarbonyloxy-21-acetoxy-17α-hydroxypregn-5-en-20-one in 400 parts of acetic anhydride is heated at the boiling point under reflux for 12 hours. The solution is then distilled to dryness in vacuo under nitrogen. Traces of acetic anhydride and acetic acid are removed from the oily residue by dissolving the latter in 1100 parts of ethyl acetate, then washing this solution successively with water, aqueous 5% (W/V) sodium carbonate, water, and finally saturated brine. The washed ethyl acetate solution is dried over anhydrous sodium sulfate, treated with decolorizing charcoal, and then stripped of solvent by vacuum distillation. The residue, recrystallized twice from methanol, affords pure 3β-ethoxycarbonyloxy-17α,21-diacetoxypregn-5-en-20-one, the melting point of which is 190-192° C. (uncorr.).

C. *3β-ethoxycarbonyloxy-17α,21-diacetoxypregn-5-ene-7,20-dione.*—To 36 parts of 3β-ethoxycarbonyloxy-17α,21-diacetoxypregn-5-en-20-one is added 240 parts of acetic acid and 100 parts of acetic anhydride, whereupon the steroid is selectively oxidized with 21 parts of anhydrous sodium chromate in accordance with the procedure detailed in Example 2 hereinbefore. The residual solids, following stripping of the ethyl acetate solvent, are recrystallized several times from methanol to furnish pure, solvated 3β-ethoxycarbonyloxy-17α,21-diacetoxypregn-5-ene-7,20-dione, which, after desolvation by heating at 110° C. in vacuo for 3 hours, melts at 195-200° C. (uncorr.). The product has the formula

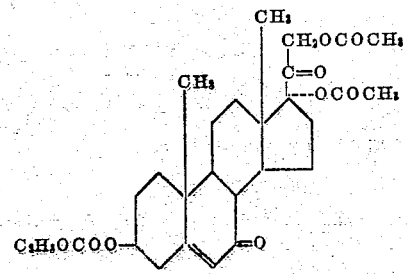

*Example 13*

3β,17α,21-trihydroxypregn-5-ene-7,20-dione.—To a solution of 5 parts of 3β-ethoxycarbonyloxy-17α,21-diacetoxypregn-5-ene-7,20-dione in 320 parts of methanol under an atmosphere of nitrogen and at 30° C. is rapidly added, with agitation, 115 parts of methanol containing approximately 3 parts of caustic potash. With continued agitation, the reactants are allowed to cool to room temperatures, and after 9 minutes, treated with 23 parts of aqueous 65% (W/V) methanol. Approximately 6 minutes later, the mixture is rapidly chilled to 15° C. and then acidified with 100 parts of aqueous 5% (W/V) acetic acid. This mixture is intimately combined with 6000 parts of cold, aqueous 10% (W/V) brine, whereupon successive extractions with 1300 parts and 700 parts of dichloromethane are carried out. The combined extracts are washed with aqueous 5% (W/V) brine, then dried over anhydrous sodium sulfate, and finally stripped of solvent in vacuo. The solid residue, upon recrystallization from ethyl acetate, affords pure 3β,17α,21-trihydroxypregn-5-ene-7,20-dione, melting at 224–227° C. (corr.). The product thus obtained has the formula

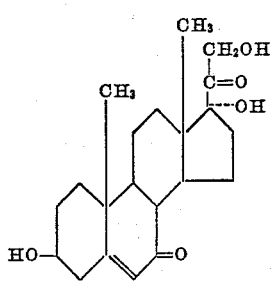

Example 14

21 - acetoxy - 3β,17α - dihydroxypregn - 5 - ene - 7,20-dione.—Approximately 10 parts of 3β,17α,21-trihydroxypregn-5-ene-7,20-dione is treated with a pyridine solution containing 3 parts of acetic anhydride, the reaction being carried out and the product worked up by the same technique employed in Example 8 hereinbefore. The 21-acetoxy-3β,17α-dihydroxypregn-5-ene-7,20-dione thus obtained is characterized by a maximum in the ultraviolet spectrum at 237 mµ in methanol solution, and by principal absorption bands in the infrared at 2.92, 5.73, 5.82, 6.04, 6.17, and 8.10 µ, the latter values being determined in a potassium bromide disc. The product has the formula

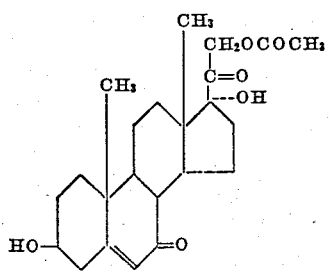

What is claimed is:

1. A compound of the formula

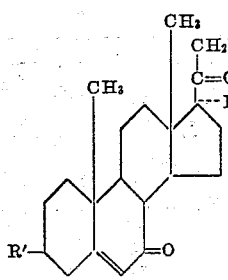

wherein one R is selected from the group consisting of hydroxyl and lower alkanoyloxy radicals, and the other R is selected from the group consisting of hydrogen, and hydroxyl and lower alkanoyloxy radicals; and wherein R' is selected from the group consisting of hydroxy, lower alkanoyloxy, trifluoroacetoxy, and ethoxycarbonyloxy radicals.

2. A compound of the formula

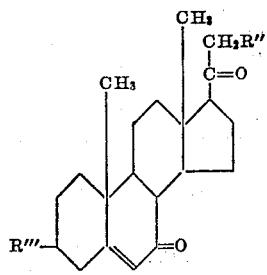

wherein R" and R''' are lower alkanoyloxy radicals.

3. 3β,21-diacetoxypregn-5-ene-7,20-dione.
4. 3β,17α-dihydroxypregn-5-ene-7,20-dione.
5. 3β,17α,21-trihydroxypregn-5-ene-7,20-dione.

6. In a process for the manufacture of compounds of the formula

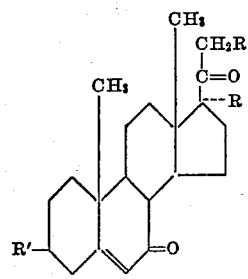

wherein one R is selected from the group consisting of hydroxyl and lower alkanoyloxy radicals, and the other R is selected from the group consisting of hydrogen, and hydroxyl and lower alkanoyloxy radicals; and wherein R' is selected from the group consisting of hydroxy, lower alkanoyloxy, trifluoroacetoxy, and ethoxycarbonyloxy radicals, the step which comprises contacting, in a predominantly lower alkanoic acid medium containing 15–35% a compatible dehydrating agent, an anhydrous alkali chromate with a steroid ester of the formula

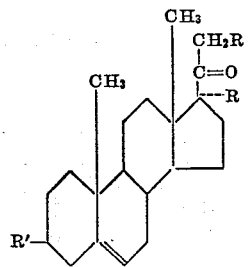

in which formula one R is a lower alkanoyloxy radical and the other R is selected from the group consisting of hydrogen and lower alkanoyloxy radicals; and R' is selected from the group consisting of lower alkanoyloxy, trifluoroacetoxy, and ethoxycarbonyloxy radicals; contact being maintained at temperatures ranging from 25° to 50° centigrade for periods of time amounting to between 36 and 60 hours.

7. In a process for the manufacture of compounds of the formula

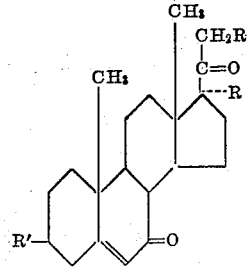

wherein one R is selected from the group consisting of hydroxyl and lower alkanoyloxy radicals, and the other R is selected from the group consisting of hydrogen, and hydroxyl and lower alkanoyloxy radicals; and wherein R' is selected from the group consisting of hydroxy, lower alkanoyloxy, trifluoroacetoxy, and ethoxycarbonyloxy radicals, the step which comprises contacting, in a predominantly acetic acid medium containing 15–35% of acetic anhydride, an anhydrous alkali chromate with a steroid ester of the formula

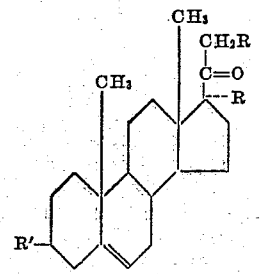

in which formula one R is a lower alkanoyloxy radical and the other R is selected from the group consisting of hydrogen and lower alkanoyloxy radicals; and R' is selected from the group consisting of lower alkanoyloxy, trifluoroacetoxy, and ethoxycarbonyloxy radicals; contact being maintained at temperatures ranging from 25° to 50° centigrade for periods of time amounting to between 36 and 60 hours.

8. In a process for the manufacture of compounds of the formula

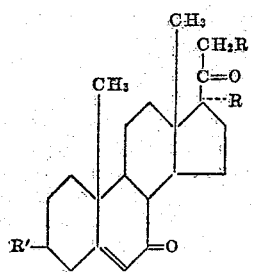

wherein one R is selected from the group consisting of hydroxyl and lower alkanoyloxy radicals, and the other R is selected from the group consisting of hydrogen, and hydroxyl and lower alkanoyloxy radicals; and wherein R' is selected from the group consisting of hydroxy, lower alkanoyloxy, trifluoroacetoxy, and ethoxycarbonyloxy radicals, the step which comprises contacting sodium chromate in a predominantly acetic acid medium containing 15–35% of acetic anhydride, with a steroid ester of the formula

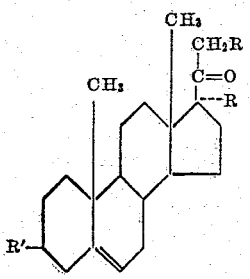

in which formula one R is a lower alkanoyloxy radical and the other R is selected from the group consisting of hydrogen and lower alkanoyloxy radicals; and R' is selected from the group consisting of lower alkanoyloxy, trifluoroacetoxy, and ethoxycarbonyloxy radicals; contact being maintained at temperatures ranging from 25° to 50° centigrade for periods of time amounting to between 36 and 60 hours.

9. In a process for the manufacture of compounds of the formula

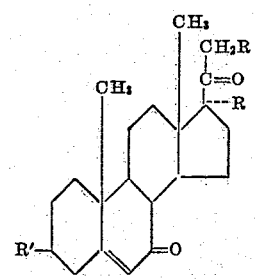

wherein one R is selected from the group consisting of hydroxyl and lower alkanoyloxy radicals, and the other R is selected from the group consisting of hydrogen, and hydroxyl and lower alkanoyloxy radicals; and wherein R' is selected from the group consisting of hydroxy, lower alkanoyloxy, trifluoroacetoxy, and ethoxycarbonyloxy radicals, the step which comprises contacting sodium chromate in a predominantly acetic acid medium containing 15–35% of acetic anhydride, with a steroid ester of the formula

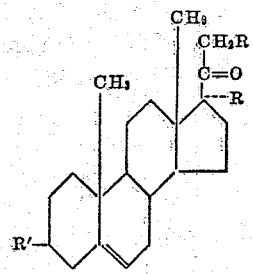

in which formula one R is a lower alkanoyloxy radical and the other R is selected from the group consisting of hydrogen and lower alkanoyloxy radicals; and R' is selected from the group consisting of lower alkanoyloxy, trifluoroacetoxy, and ethoxycarbonyloxy radicals; contact being maintained at temperatures of 35° to 40° centigrade for approximately 45 hours.

10. 21-acetoxy-3β-hydroxypregn-5-ene-7,20-dione.
11. 3β,21-dihydroxypregn-5-ene-7,20-dione.

References Cited in the file of this patent
UNITED STATES PATENTS

| | | |
|---|---|---|
| 2,702,810 | Murray et al. | Feb. 22, 1955 |
| 2,703,326 | Murray et al. | Mar. 1, 1955 |
| 2,824,882 | Marshall | Feb. 25, 1958 |
| 2,840,576 | Marshall et al. | June 24, 1958 |

OTHER REFERENCES

Marshall et al.: J.A.C.S., vol. 79, pages 6303–13 (1957).
Oppenauer: Chemical Abstracts 44, 3871 (1950).
Lenhard: J.A.C.S., March 1956, pages 989–992.